United States Patent
Wurm

(10) Patent No.: US 11,262,268 B2
(45) Date of Patent: Mar. 1, 2022

(54) METHOD FOR INSPECTING A SEAL OF A FLEXIBLE CONTAINER

(71) Applicant: Single Use Support GmbH, Kufstein (AT)

(72) Inventor: Thomas Wurm, Stumm (AT)

(73) Assignee: SINGLE USE SUPPORT GMBH, Kufstein (AT)

(*) Notice: Subject to any disclaimer, the term of this patent is extended or adjusted under 35 U.S.C. 154(b) by 64 days.

(21) Appl. No.: 16/374,020

(22) Filed: Apr. 3, 2019

(65) Prior Publication Data
US 2019/0226939 A1    Jul. 25, 2019

Related U.S. Application Data

(63) Continuation of application No. PCT/AT2018/060050, filed on Feb. 23, 2018.

(30) Foreign Application Priority Data

Feb. 24, 2017 (AT) ............................. A 60014/2017
May 12, 2017 (AT) ............................. A 50408/2017

(51) Int. Cl.
*G01M 3/22* (2006.01)
*G01M 3/20* (2006.01)
*G01M 3/02* (2006.01)

(52) U.S. Cl.
CPC .............. *G01M 3/227* (2013.01); *G01M 3/02* (2013.01); *G01M 3/202* (2013.01)

(58) Field of Classification Search
CPC ......... G01M 3/02; G01M 3/202; G01M 3/227
See application file for complete search history.

(56) References Cited

U.S. PATENT DOCUMENTS

| 3,487,677 A | 1/1970 | Molitor |
| 3,813,923 A | 6/1974 | Pendleton |
| 4,055,984 A * | 11/1977 | Marx .................... G01M 3/027 73/40.7 |

(Continued)

FOREIGN PATENT DOCUMENTS

| CN | 1447912 | 10/2003 |
| CN | 101983324 | 3/2011 |

(Continued)

OTHER PUBLICATIONS

Search Report dated Nov. 8, 2017 in Ausuian Application No. A 50408/2017, with English translation.

(Continued)

*Primary Examiner* — Natalie Huls
(74) *Attorney, Agent, or Firm* — Wenderoth, Lind & Ponack, L.L.P.

(57) ABSTRACT

A method for inspecting a seal of a flexible container for a fluid, particularly a fluid medication, includes covering the container at least in part—preferably completely—by a gas-permeable layer. The container, together with the gas-permeable layer, is arranged in a flexible, substantially gas-tight bag, and the substantially gas-tight bag is evacuated by pumping out via a bag opening. The container is filled with a noble gas, and the presence of noble gas, which escapes out of the bag opening from the container via a leak through the gas-permeable layer, is detected.

23 Claims, 1 Drawing Sheet

(56) References Cited

U.S. PATENT DOCUMENTS

| | | | |
|---|---|---|---|
| 4,813,268 A | 3/1989 | Helvey | |
| 4,951,496 A | 8/1990 | Aarts | |
| 5,497,654 A | 3/1996 | Lehmann | |
| 6,354,142 B1 | 3/2002 | Nothhelfer et al. | |
| 6,460,405 B1* | 10/2002 | Mayer | G01M 3/20 73/40.7 |
| 6,584,829 B1 | 7/2003 | Flosbach et al. | |
| 6,945,092 B2 | 9/2005 | Widt | |
| 7,614,282 B2 | 11/2009 | Eliasson | |
| 7,849,729 B2 | 12/2010 | Miller et al. | |
| 7,905,132 B1 | 3/2011 | Chamberlain | |
| 8,505,361 B2 | 8/2013 | Miller et al. | |
| 8,910,509 B2 | 12/2014 | Terentiev et al. | |
| 9,046,437 B2 | 6/2015 | Miller et al. | |
| 9,139,348 B2 | 9/2015 | Voute | |
| 9,534,980 B2 | 1/2017 | Dahlberg et al. | |
| 9,632,001 B2 | 4/2017 | Decker et al. | |
| 9,637,716 B2 | 5/2017 | Dahlberg et al. | |
| 9,810,600 B2 | 11/2017 | Wetzig et al. | |
| 9,927,321 B2 | 3/2018 | Decker | |
| 10,112,764 B2 | 10/2018 | Voute | |
| 10,119,883 B2 | 11/2018 | van Triest et al. | |
| 10,240,117 B2 | 3/2019 | Dahlberg et al. | |
| 10,845,266 B2 | 11/2020 | Decker et al. | |
| 2003/0233866 A1 | 12/2003 | Widt | |
| 2008/0127716 A1 | 6/2008 | Eliasson | |
| 2008/0148817 A1 | 6/2008 | Miller et al. | |
| 2009/0173144 A1* | 7/2009 | Lukens | G01M 3/229 73/40.7 |
| 2011/0011164 A1* | 1/2011 | Terentiev | G01M 3/227 73/40.7 |
| 2011/0079174 A1 | 4/2011 | Miller et al. | |
| 2012/0128275 A1* | 5/2012 | Voute | B65B 31/02 383/105 |
| 2013/0210153 A1* | 8/2013 | Bottcher | G01N 21/783 436/1 |
| 2013/0239875 A1 | 9/2013 | Miller et al. | |
| 2014/0083170 A1* | 3/2014 | Pavlik | G01M 3/3263 73/49.2 |
| 2014/0165707 A1* | 6/2014 | Dahlberg | G01M 3/32 73/49.2 |
| 2014/0193897 A1 | 7/2014 | Dahlberg et al. | |
| 2014/0311222 A1 | 10/2014 | Decker et al. | |
| 2014/0326051 A1 | 11/2014 | Wetzig et al. | |
| 2015/0192489 A1 | 7/2015 | Decker et al. | |
| 2015/0241298 A1 | 8/2015 | Decker | |
| 2015/0375914 A1 | 12/2015 | Voute | |
| 2016/0040109 A1 | 2/2016 | Dahlberg et al. | |
| 2017/0097275 A1 | 4/2017 | van Triest et al. | |
| 2017/0205307 A1* | 7/2017 | Hogreve | G01M 3/227 |
| 2017/0268957 A1 | 9/2017 | Wetzig et al. | |
| 2018/0087997 A1* | 3/2018 | Thenard | A61J 1/18 |
| 2018/0188130 A1* | 7/2018 | Hogreve | G01M 3/229 |
| 2019/0145852 A1 | 5/2019 | Decker et al. | |

FOREIGN PATENT DOCUMENTS

| | | |
|---|---|---|
| CN | 102482021 | 5/2012 |
| CN | 103620362 | 3/2014 |
| CN | 104040317 | 9/2014 |
| DE | 196 42 099 | 4/1998 |
| DE | 199 62 006 | 6/2001 |
| DE | 10 2011 106 165 | 1/2013 |
| DE | 10 2012 217 945 | 4/2014 |
| DE | 10 2014 224 799 | 6/2016 |
| DE | 20 2014 010 756 | 9/2016 |
| EP | 0 332 239 | 9/1989 |
| EP | 0 741 288 | 11/1996 |
| EP | 0 882 968 | 12/1998 |
| JP | 62-112027 | 5/1987 |
| WO | 02/14824 | 2/2002 |
| WO | 2009/043647 | 4/2009 |
| WO | 2009/145991 | 12/2009 |
| WO | 2013/000544 | 1/2013 |
| WO | 2013/072173 | 5/2013 |
| WO | 2013/102610 | 7/2013 |
| WO | 2013/186295 | 12/2013 |
| WO | 2015/140042 | 9/2015 |
| WO | 2016/146950 | 9/2016 |

OTHER PUBLICATIONS

International Search Report dated Jun. 1, 2018 in International (PCT) Application No. PCT/AT2018/060050.

Vishwas Pethe et al., "Helium integrity testing: a new way to ensure single-use bag integrity", Pharmaceutical Processing 2011 Advantage Business Media, vol. 26, No. 8, pp. 22-27.

Vishwas Pethe et al., "Integrity Testing of Flexible Containers", BioPharm International 2011, vol. 24, No. 11, pp. 42-49.

English Translation of "Inert gas", Wikipedia, Retrieved Apr. 15, 2021, Retrieved from: "https://en.wikipedia.org/w/index.php?title=Inert gas&oldid= 1011365633".

English Translation of "Bag", Wikipedia, Retrieved Apr. 15, 2021, Retrieved from: "https://en.wikipedia.org/w/index.php?title=Bag&oldid=1016663412".

* cited by examiner

METHOD FOR INSPECTING A SEAL OF A FLEXIBLE CONTAINER

BACKGROUND OF THE INVENTION

The present invention relates to a method for inspecting a seal of a flexible container for a fluid, in particular for a fluid medicine, as well as the flexible container for a fluid medicine itself.

Flexible containers of this type for fluid medicines can, for example, be used as what are known as single use bags, in order to store and transport very valuable fluid biopharmaceuticals. They can consist of two layers of plastic—in particular plastic films—which are flexible and heat sealed at the edges ("flexible wall").

Inspecting the seal of these containers is a technical challenge, in particular because between production of the container and use thereof, the container is exposed to a number of influences which could be the cause of leaks or holes and the like. Such exposure may occur, for example, during packaging, sterilisation (for example using gamma radiation), transport, storage, unpacking as well as any manual manipulations and the like.

Thus, the prior art contains an established two-stage inspection method in which, initially at the production site for the container, a precise inspection is carried out and secondly, a further inspection is carried out at the point of use.

The inspection at the production site functions by introducing helium into the container. In this regard, it should be noted that this is actually only applicable to the container itself. Tubes, connectors, filters and the like, if any, are not tested along with it. The container filled with helium is disposed in a vacuum chamber. By evacuating the vacuum chamber and detecting helium present in the vacuum chamber which has escaped through any leaks, a conclusion can be drawn as regards the seal or the presence of a leak. This measurement is highly sensitive. Leaks with sizes of less than 5 µm can be detected. However, at the same time, a heavy load is placed on the container because pressurizing with helium causes the container to expand and inflate in the manner of a balloon. Greater precision at the point of use cannot be achieved using this prior art method, however, because appropriate equipment for high vacuum and the like is not readily available.

Leaks which only occur after this inspection has been carried out at the production site naturally cannot be detected in this manner.

As mentioned, a further inspection is carried out directly at the point of use. In this regard, the container is pressurized with a relatively low pressure (approximately 30 millibar) and monitored for approximately half an hour. A conclusion regarding the escape of a gas from the container can be drawn from the pressure changes. If these are too great, then the presence of a leak can be concluded. However, leaks with a size of 20 µm or less cannot be detected.

At the point of use, it is not practical to employ the prior art method carried out on the containers at the production site because the (industrial) facilities, such as a vacuum chamber and the availability of helium, might not be easy to reproduce at the point of use.

However, the sensitivity to leaks greater than 20 µm in size at the point of use is in the end not sufficient, because even holes of more than 3 to 5 µm are considered to be capable of leading to non-sterility inside the container (what is known as "bacterial ingress"). In short, a hole more than 3 to 5 µm in size allows bacteria to gain access to the interior of the container.

Thus, the objective of the invention is to provide a method and a device which can be used to reduce the risk of a failure of the sterility of a flexible container for fluid medicines and similar products, for example from the pharmaceutical production process.

SUMMARY OF THE INVENTION

With regard to the method, the above objective is achieved by the following:
- the container (in other words the test specimen) is at least partially—preferably completely—covered with a gas-permeable layer,
- the container including the gas-permeable layer is disposed in a flexible essentially gas-tight bag (the escape of small quantities of fluid following sealing may be acceptable, depending on the application),
- the essentially gas-tight bag is evacuated by pumping out via a bag opening,
- the container is filled with a noble gas, and
- the presence of noble gas which escapes via a leak from the container through the gas-permeable layer via the bag opening is detected.

By using a gas-permeable layer and an additional essentially gas-tight bag, the vacuum chamber used in the prior art can be dispensed with in the method. This has, on the one hand, the advantage that the complicated measuring apparatus as described in connection with the prior art inspection at the production site, is no longer required. At the same time, inflation of the container is prevented and because of this, the introduction of fresh damage, in particular leaks, is avoided.

This is because the evacuation of the space between the container to be inspected and the essentially gas-fight bag means that it is only atmospheric pressure that acts (via the essentially gas-tight bag and the gas-permeable layer) on the flexible container from outside.

When the space between the flexible container and the essentially gas-tight bag has been evacuated, the gas-permeable layer also allows helium, which escapes from the container via a leak, to migrate by pumping it out from the essentially gas-tight bag to a detecting device. Advantageously and preferably, a nonwoven material or the like may be used as the gas-permeable layer. The gas-permeable layer may be produced from plastic.

In summary, the method in accordance with the invention has on the one hand the advantage of the necessary precision, because leaks with sizes of less than 3 µm to 5 µm can be detected, and on the other hand the mechanical load on the flexible container to be tested is smaller, reducing the risk of leaks caused by the inspection.

The container may be filled with the noble gas before, during or after evacuating the bag.

Regarding the device, the objective is achieved by means of a set formed by a flexible container for a fluid, in particular for a fluid medicine, and a pressurized gas container to accommodate a noble gas. This, too, reduces the necessity for complicated laboratory equipment at the inspection site, because the appropriate noble gas is supplied directly along with the flexible container. By pre-packaging the flexible container together with the pressurized gas container, sources of errors when carrying out the inspection, which can easily occur when filling the container with noble gas, can be eliminated. Examples are pressurizing with too high a pressure or incorrect connection of an external source of pressure to the container (for example because the connectors do not fit together well enough or the like).

In this regard, the container comprises an opening which can essentially be sealed in a gas-tight manner (the escape of smaller quantities of fluid after sealing may be acceptable, depending on the application) and which is configured in a manner such that a fluid connection between the container and the pressurized gas container which is gas-tight to the outside can be produced.

The bag may also be part of the set in accordance with the invention.

By means of the invention, it is also possible to test the container including accessories such as tubes, connectors, valves and the like.

More than one bag opening may be provided, whereupon judicious positioning on the bag, for example on opposite sides, means that paths to the detector for the noble gas which are as short as possible can be obtained.

The container may, for example, consist of polyethylene, ethylene-vinyl acetate, fluoropolymers or blends thereof.

Protection is also sought for the use of a set in accordance with the invention is also protected by the method in accordance with the invention.

As mentioned, the container may be filled by bringing the container into fluid connection—preferably gas-tight to the outside—with a pressurized gas container filled with the noble gas via an opening.

In a very particularly preferred embodiment, prior to evacuation, the pressurized gas container may be disposed—preferably in its entirety—inside the essentially gas-tight bag. In this regard, no tubes have to be fed out of the bag, the edges of which must be assiduously sealed to the outside. In addition, this allows for a particularly simple procedure for the method. Activating the pressurized gas container can in this regard by carried out in a remote manner via any type of electromagnetic waves. Because the essentially gas-tight bag may also be flexible or elastic, filling of the container with noble gas may also initiated by means of a switch on the pressurized gas container which is actuated through the bag.

Very particularly preferably, in one embodiment, the procedure for producing the fluid connection between the pressurized gas container and the container may be carried out automatically and mechanically.

In other words, by disposing the entirety of the pressurized gas container within the bag, this means that the prior art practice of passing tubes from a source of helium into the test chamber and the concomitant additional risk to the seal can be avoided.

Preferably, helium may be used as the noble gas because among the noble gases, this has the lowest molecular weight and therefore—insofar as this is an indication of the corresponding scale of its size—has the smallest "dimensions". In this manner, the smallest possible holes or leaks in the container can be detected (because under some circumstances, larger noble gas atoms might not be able to penetrate through the holes in question).

It may be beneficial to the accuracy of the measurement for the essentially gas-tight bag to be kept evacuated by being continuously pumped out. This means that pumping out can be initiated when a representative signal is delivered by the detection device. Naturally, it is also possible to pump out in pulses or to program and control it in another manner in order, for example, to save energy.

In order to detect the presence of the noble gas escaping from the bag opening, mass spectrometers, for example, may be used as the detectors.

The fluid is preferably a fluid medicine. However, the invention may also be employed for similar high value products such as, for example, precursors of medicines and other substances which are formed during (bio)pharmaceutical production processes, wherein the small-scale seal of the container is also important. The fluid may also preferably be a liquid. In a most particularly preferred embodiment, the fluid may be a fluid medicine.

The flexible container may—preferably once and once only—be used for the storage and/or transport of a fluid medicine as long as no leaks are detected during the inspection. Thereafter, the container can be disposed of. In this case, they are termed single use bags.

It may be beneficial to the accuracy of the measurement for the method to carried out on an empty—preferably completely empty—container. Particularly effectively, the method may be employed with containers of the type which are so flexible that they can essentially be completely emptied without the need for the use of a reduced pressure.

In respect of the set, the pressurized gas container may be connected to the container via the sealable opening, wherein preferably, a tube and/or pipe connection is provided.

It may be of particular advantage for the pressurized gas container to be relatively small. This means in particular that its capacity should be such that a quantity of the noble gas which is stored in the pressurized gas container, under normal conditions, i.e. at atmospheric pressure, does not exceed twice the nominal capacity of the container. Particularly preferably, the capacity may be such that this volume does not exceed the nominal volume capacity of the container and more particularly preferably three quarters and in particular half of the nominal volume capacity.

BRIEF DESCRIPTION OF DRAWINGS

Further advantages and details of the invention will become apparent from the figures as well as the accompanying description of the figures. In the drawings.

DETAILED DESCRIPTION OF THE INVENTION

In one embodiment of the method in accordance with the invention, helium is used as the noble gas.

Figure 1:
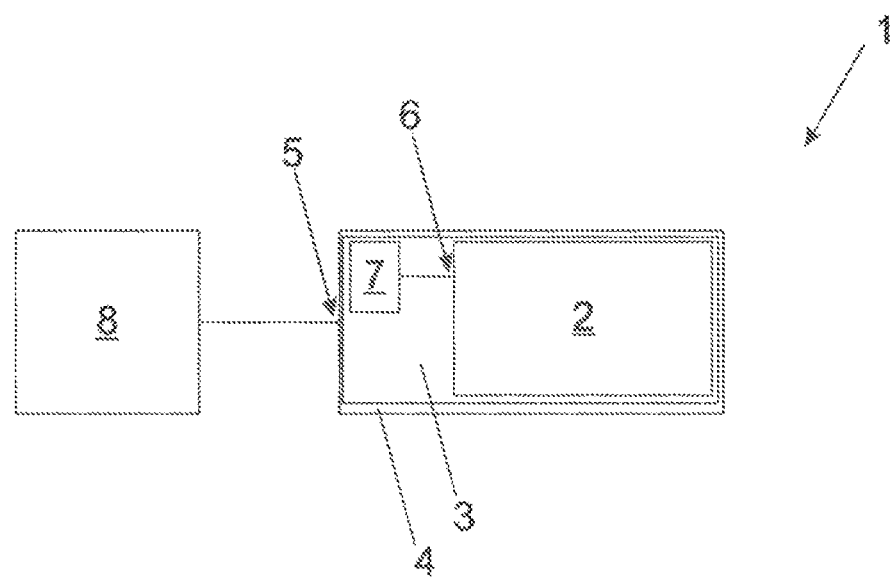
FIG. 1 shows a diagrammatic representation of the test setup for carrying out the method in accordance with the invention.

The test setup is shown in FIG. 1 in a highly diagrammatic manner and may be designed to be so compact that the inspection of the seal may also be carried out reliably at the site where the container 2 is filled. The container 2 is flexible and constructed as shown diagrammatically in FIG. 2a, for example. It is at least partially—preferably completely—covered with the gas-permeable layer 3.

The container 2 is in a set with the pressurized gas container 7. The pressurized gas container 7 is connected to the container 2 by means of a tube connection and the opening 6 on the container 2. The opening 6 can be sealed in a gas-tight manner and is indicated in only a diagrammatic manner in FIG. 1 as the intersection of the tube connection with the container 2.

The container 2 is completely covered by the gas-permeable layer 3, wherein the gas-permeable layer 3 in this embodiment is formed as a nonwoven material. The container covered with the gas-permeable layer is disposed in the essentially gas-tight bag 4 together with the tube connection and the pressurized gas container 7. The interior of the bag 4 is connected to the detector 8 via the bag opening 5 (also shown only diagrammatically as the intersection between the bag 4 and a connection of the detector 8 with the bag 4). The detector 8 in this case also comprises a vacuum pump for evacuating the bag 4 as well as the complete hardware and software required for detecting helium in the gas stream brought about by the evacuation.

During evacuation, the gas-permeable layer 3 reduces any destructive forces on the container 2. At the same time, in the evacuated condition of the outer bag 4, the gas-permeable layer 3 allows helium escaping from a leak in the container 2 to migrate to the bag opening 5. The escaped helium can be pumped out from the bag opening 5 in the direction of the detector 8. In other words, the gas-permeable layer 3 prevents the outer bag 4 from sealing any holes in the container 2 upon evacuation.

Multiple manifestations of the bag opening 5 may be present in the measurement setup (on container 2), for example on the opposite sides of the container 2. In this manner, escaped helium can take as short as possible a route to the detector 8.

Naturally, prior to detection, the container 2 has to be filled with noble gas from the pressurized gas container 7. This may be carried out either before, during or after the evacuation. When filling following evacuation, the opening 6 must be correspondingly opened; this may, for example, be carried out contactlessly by the transmission of electromagnetic waves.

The pressurized gas container 7 in this embodiment is dimensioned in a manner such that, after opening the opening 6, the noble gas (helium) takes up approximately half of the nominal volume of the container 2 (at approximately 1 bar atmospheric pressure). (Thus, there is a difference in pressure between the interior of the container 2 and the space between the container 2 and the essentially gas-tight bag 4 of approximately 1 bar, because the space has in fact been evacuated).

Figure 2A:
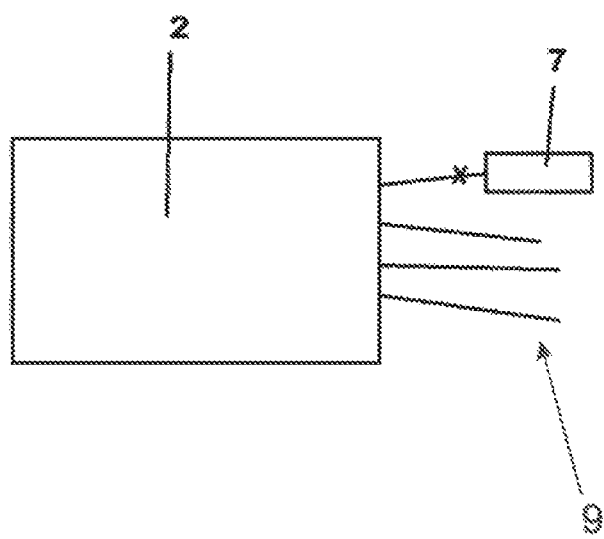
FIGS. 2a and 2b show diagrammatic images of the set in accordance with the invention as well as the set in accordance with the invention after covering with the gas-permeable layer.

An embodiment of the set in accordance with the invention formed by the flexible container 2 and the pressurized gas container 7 is shown photographically in FIG. 2a. It can be seen here how the pressurized gas container 7 is connected to the container 2 via a small (black) tube. The opening of the container 2 can be sealed, whereupon the sealing mechanism in this embodiment is associated with the pressurized gas container 7 or is disposed in it. The container 2 also has further connections which can be seen on the right hand side of the image and, for example, serve for filling and emptying the container 2.

The container 2 shown by way of example in FIG. 2a is designed as what is known as a single use bag, i.e. it is intended to be disposed of after having been used just once. Containers of this type may have a nominal volume capacity of 10 litres, for example.

Figure 2B:
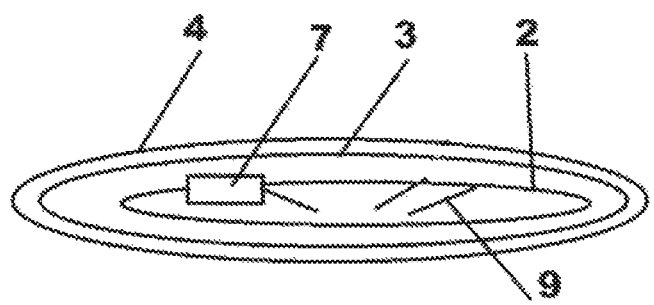

FIG. 2b shows the container 2 together with the pressurized gas container 7 in the condition in which it is completely covered or surrounded by the gas-permeable layer 3 and inside the bag 4. After sealing the bag 4, the disposition is as shown in FIG. 2b. (The detector 8 is not shown in FIG. 2b). It should be noted that in the evacuated state, as a rule, there is of course no longer a space between the gas-permeable layer 3 and the container 2 and the bag 4 respectively. These gaps are only shown in FIG. 2b for the sake of clarity.

The pressurized gas container can then dispense a defined quantity of helium into the container 2. To this end, a special valve may be employed, for example. The pressurized gas container 7 (also known as the "helium applicator") in the present case is also intended for a single use, but naturally may also be designed for repeated use.

When filling the container 2 with helium from the pressurized gas container 7, a fluid connection which is gas-tight to the outside (i.e. to the space between container 2 and bag 4) is formed between the pressurized gas container and the interior of the container 2.

Because of the relatively small quantity of helium, an excess pressure (i.e. a pressure far above the normal atmospheric pressure of 1 bar) in the container 2 is avoided.

As already mentioned, evacuation may be carried out before or after introducing the helium into the container 2. Too long an interval between filling the container 2 and detecting the helium by the detector 8 should not pass, however, as if so, diffusion of the helium through the container 2 could falsify the results of the measurement.

In any case, the presence of a leak in the container 2 is concluded if the quantity of the helium detected by the detector 8 exceeds a specific threshold.

A further advantage of the use of the gas-permeable layer lies in the fact that the volume in the essentially gas-tight bag 4 to be evacuated is smaller, whereupon the ratio of the helium (if a leak is present) to the atmospheric air is increased.

The presence (because the threshold has been exceeded, for example) or absence of a leak may be output, for example, via a user interface on the detector 8.

Overall, the invention means that a smaller mechanical load is exerted on the container 2 to be inspected, which reduces the safety risk and the test outlay.

The invention claimed is:

1. A method for inspecting a seal of a flexible container for a fluid, the method comprising:
   covering the container at least partially with a gas-permeable layer;
   disposing the container including the gas-permeable layer in a flexible essentially gas-tight bag;
   evacuating the essentially gas-tight bag by pumping out via a bag opening;
   bringing the container into fluid connection with a pressurized gas container filled with a noble gas via an opening so as to fill the container with the noble gas, wherein prior to the evacuating of the essentially gas-tight bag, the pressurized gas container is disposed in its entirety inside the essentially gas-tight bag; and
   detecting the presence of noble gas, which escapes via a leak from the container, through the gas-permeable layer via the bag opening.

2. The method as in claim 1, wherein the noble gas is helium.

3. The method as in claim 1, wherein the essentially gas-tight bag is kept evacuated by being continuously pumped out.

4. The method as in claim 1, wherein a detector is used in order to detect the presence of the noble gas escaping via the bag opening.

5. The method as in claim 1, wherein the flexible container is used for the storage and/or transport of a fluid, as long as a quantity of the detected noble gas escaping from the bag opening does not exceed a threshold.

6. The method as in claim 5, wherein the container is disposed of after use for storage and/or for transport of fluid.

7. The method according to claim 5, wherein the flexible container is used once and only once for the storage and/or transport of a fluid, as long as a quantity of the detected noble gas escaping from the bag opening does not exceed a threshold.

8. The method according to claim 5, wherein the fluid is a fluid medicine.

9. The method as in claim 1, wherein prior to the covering of the container, the container is empty.

10. The method according to claim 9, wherein prior to the covering of the container, the container is completely empty.

11. The method according to claim 1, wherein the fluid is a fluid medicine.

12. The method according to claim 1, wherein the container is completely covered with the gas-permeable layer.

13. A set for use in the method for inspecting the seal of the flexible container for a fluid as set forth in claim 1, the set comprising:
a flexible container for a fluid, and
a pressurized gas container to accommodate a noble gas, wherein the container comprises an opening which can essentially be sealed in a gas-tight manner and which is configured in a manner such that a fluid connection between the container and the pressurized gas container which is gas-tight to the outside can be produced.

14. The set as in claim 13, wherein the pressurized gas container is connected to the sealable opening of the container.

15. The set according to claim 14, wherein the pressurized gas container is connected to the sealable opening of the container by a tube and/or pipe connection.

16. The set as in claim 13, wherein a nominal capacity of the pressurized gas container is such that a volume of the noble gas present at atmospheric pressure does not exceed twice a nominal capacity of the container.

17. The set as in claim 16, wherein a nominal capacity of the pressurized gas container is such that a volume of the noble gas present at atmospheric pressure does not exceed the volume capacity of the container.

18. The set as in claim 17, wherein a nominal capacity of the pressurized gas container is such that a volume of the noble gas present at atmospheric pressure does not exceed three quarters of the nominal volume capacity of the container.

19. The set according to claim 18, wherein the nominal capacity of the pressurized gas container is such that the volume of the noble gas present at atmospheric pressure does not exceed half of the nominal volume capacity of the container.

20. The set as in claim 13, wherein the container is so flexible that it can essentially be completely emptied without the use of a reduced pressure.

21. The set according to claim 13, wherein the fluid is a fluid medicine.

22. The method as in claim 1, wherein the method is carried out using a set including:
a flexible container for a fluid, and
a pressurized gas container to accommodate a noble gas, wherein the container comprises an opening which can essentially be sealed in a gas-tight manner and which is configured in a manner such that a fluid connection between the container and the pressurized gas container which is gas-tight to the outside can be produced.

23. The method according to claim 22, wherein the fluid is a fluid medicine.

* * * * *